United States Patent
Saito

(10) Patent No.: US 7,271,848 B2
(45) Date of Patent: Sep. 18, 2007

(54) INFORMATION PROCESSING APPARATUS AND METHOD, AND TELEVISION SIGNAL RECEIVING APPARATUS AND METHOD

(75) Inventor: Akio Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 09/822,189

(22) Filed: Apr. 2, 2001

(65) Prior Publication Data

US 2001/0030711 A1    Oct. 18, 2001

(30) Foreign Application Priority Data

Apr. 4, 2000    (JP)    ............................. 2000-102127

(51) Int. Cl.
*H04N 5/50*    (2006.01)

(52) U.S. Cl. ...................... 348/569; 348/473; 348/563; 348/461; 725/40

(58) Field of Classification Search ................ 348/461, 348/465, 467, 468, 460, 473, 474, 563–569, 348/552–553, 734, 705–706; 725/39, 40, 725/41, 42, 61; *H04N 5/50*
See application file for complete search history.

(56) References Cited

U.S. PATENT DOCUMENTS

| 5,438,372 | A | * | 8/1995 | Tsumori et al. ............. 348/565 |
| 5,488,427 | A | * | 1/1996 | Kayashima et al. ........ 348/569 |
| 5,850,218 | A | * | 12/1998 | LaJoie et al. ................. 725/45 |
| 6,177,931 | B1 | * | 1/2001 | Alexander et al. ............ 725/52 |
| 6,236,399 | B1 | * | 5/2001 | Nishiyama et al. ......... 345/810 |
| 6,239,794 | B1 | * | 5/2001 | Yuen et al. .................... 725/41 |
| 6,412,110 | B1 | * | 6/2002 | Schein et al. ................. 725/40 |
| 6,469,753 | B1 | * | 10/2002 | Klosterman et al. ........ 348/552 |
| 6,563,547 | B1 | * | 5/2003 | Smith .......................... 348/565 |
| 6,564,378 | B1 | * | 5/2003 | Satterfield et al. ............ 725/40 |
| 6,590,618 | B1 | * | 7/2003 | Park et al. ................... 348/734 |
| 2002/0010926 | A1 | * | 1/2002 | Lee ............................. 725/40 |

* cited by examiner

*Primary Examiner*—Trang U. Tran
(74) *Attorney, Agent, or Firm*—Fitzpatrick, Cella, Harper & Scinto

(57) ABSTRACT

An information processing apparatus has: an input unit for inputting image data and program information data, the program information data indicating information on a program including the image data; a display unit for displaying an image corresponding to the image data input from the input unit; and a control unit responsive to a change in a program including images displayed by the display unit for controlling the display unit to display the changed program and the images on the same screen.

10 Claims, 9 Drawing Sheets

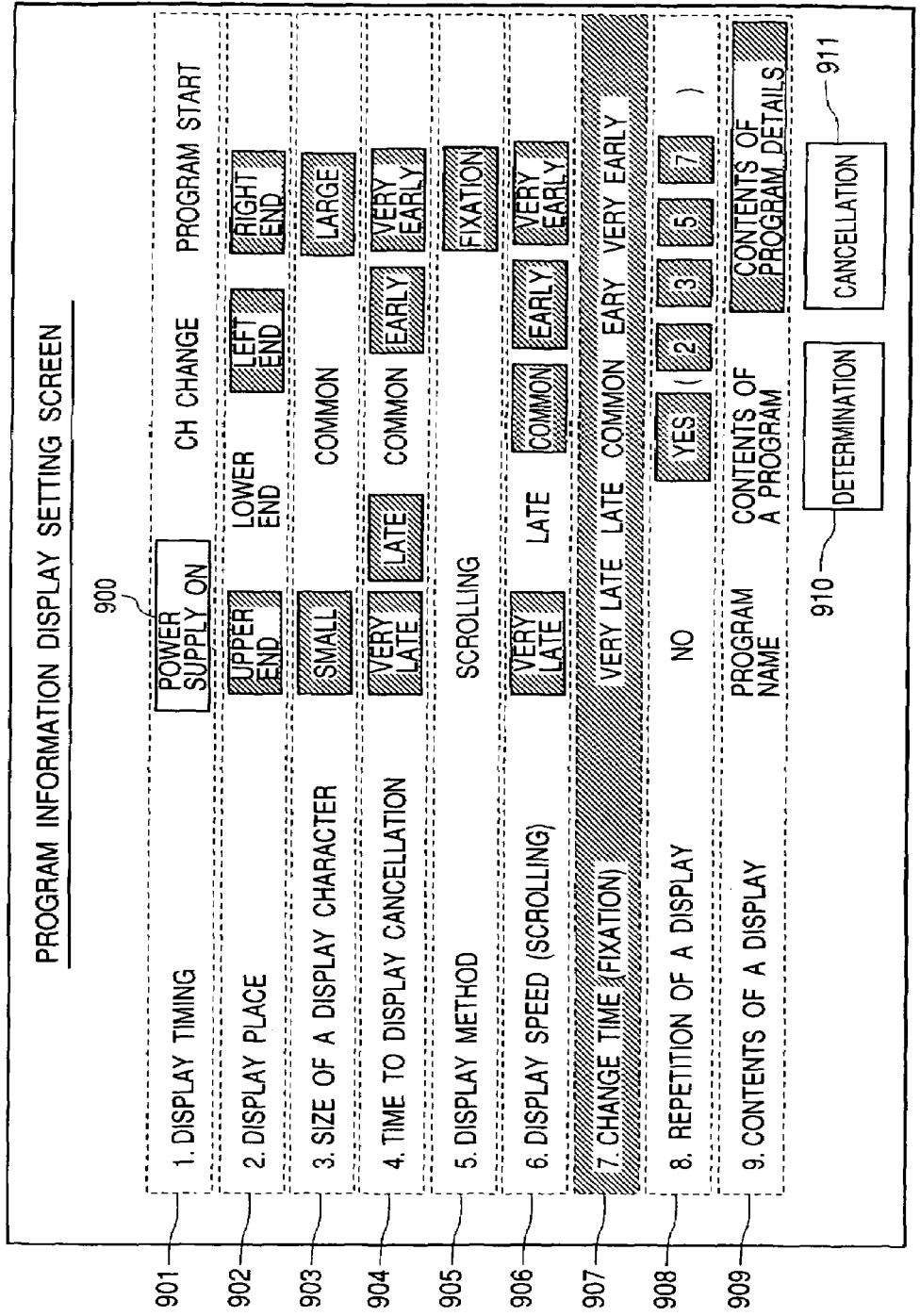

INFORMATION PROCESSING APPARATUS AND METHOD, AND TELEVISION SIGNAL RECEIVING APPARATUS AND METHOD

BACKGROUND OF THE INVENTION

1. Field of the Invention

The present invention relates to an information processing apparatus and a television signal receiving apparatus, and more particularly to an apparatus for controlling a display of images of broadcast programs.

2. Related Background Art

In digital satellite TV broadcasting utilizing a communication satellite (CS) presently in use, program information data (EPG: Electric Program Guide) is transmitted together with video data and the like as one of services for viewers and listeners. Similar service is expected to be provided also for digital satellite broadcasting utilizing a broadcast satellite (BS) scheduled in the future and for ground wave digital TV broadcasting (these digital satellite TV broadcasting and ground wave digital TV broadcasting are hereinafter simply called "digital TV broadcasting").

EPG data is received by a receiver and program information contained in the EPG data is displayed on a display unit and a display device. EPG data contains information such as a channel name, a program name, broadcasting time and date, and program contents. A user can judge from such information whether a program is worth viewing and listening.

In selecting a desired program by using an EPG screen, a user often changes the channel to confirm images and voices of the program under broadcasting. If the program is not still determined, a user is required to switch between the EPG screen and broadcast program screen several times. This operation is very cumbersome.

Images and voices of broadcast programs can be easily confirmed by sequentially changing channels of programs by using channel up/down keys.

However, if a program is selected by using the channel up/down keys or by directly entering a channel number, program information such as a broadcast program name and program contents is not displayed on the screen so that a user cannot know the details of the program from those images displayed on the screen.

If commercial images are on air at the changed channel, a user is required to wait for the end of the commercial images in order to view images of the program. It takes a time to view images of the program and a user cannot know at all what program is now on air.

Furthermore, a user cannot know the program from those images displayed when the power source is turned on or the next program starts.

SUMMARY OF THE INVENTION

Under the above-described background, the present invention solves the above-described problems and it is an object of the invention to allow a user to easily confirm the program contents or the like from images displayed on the screen when a channel is switched.

It is another object of the present invention to allow a user to easily confirm the program contents or the like from images displayed on the screen when the power supply of an apparatus is turned on or the next program starts.

In order to achieve the above objects, an embodiment of the invention provides an information processing apparatus comprising: input means for inputting image data and program information data, the program information data indicating information relating to a program including the image data; display means for displaying an image corresponding to the image data input from the input means; and control means responsive to a change in a program including images displayed by the display means for controlling the display means to display program information relating to the program information data of the changed program and the images on a same screen.

Other objects and features of the present invention will become apparent from the following detailed description of embodiments when read in conjunction with the accompanying drawings.

BRIEF DESCRIPTION OF THE DRAWINGS

FIG. 9 is a diagram showing an example of a program information display setting screen.

DESCRIPTION OF THE PREFERRED EMBODIMENTS

Embodiments of the invention will be described in detail with reference to the accompanying drawings.

Figure 1:
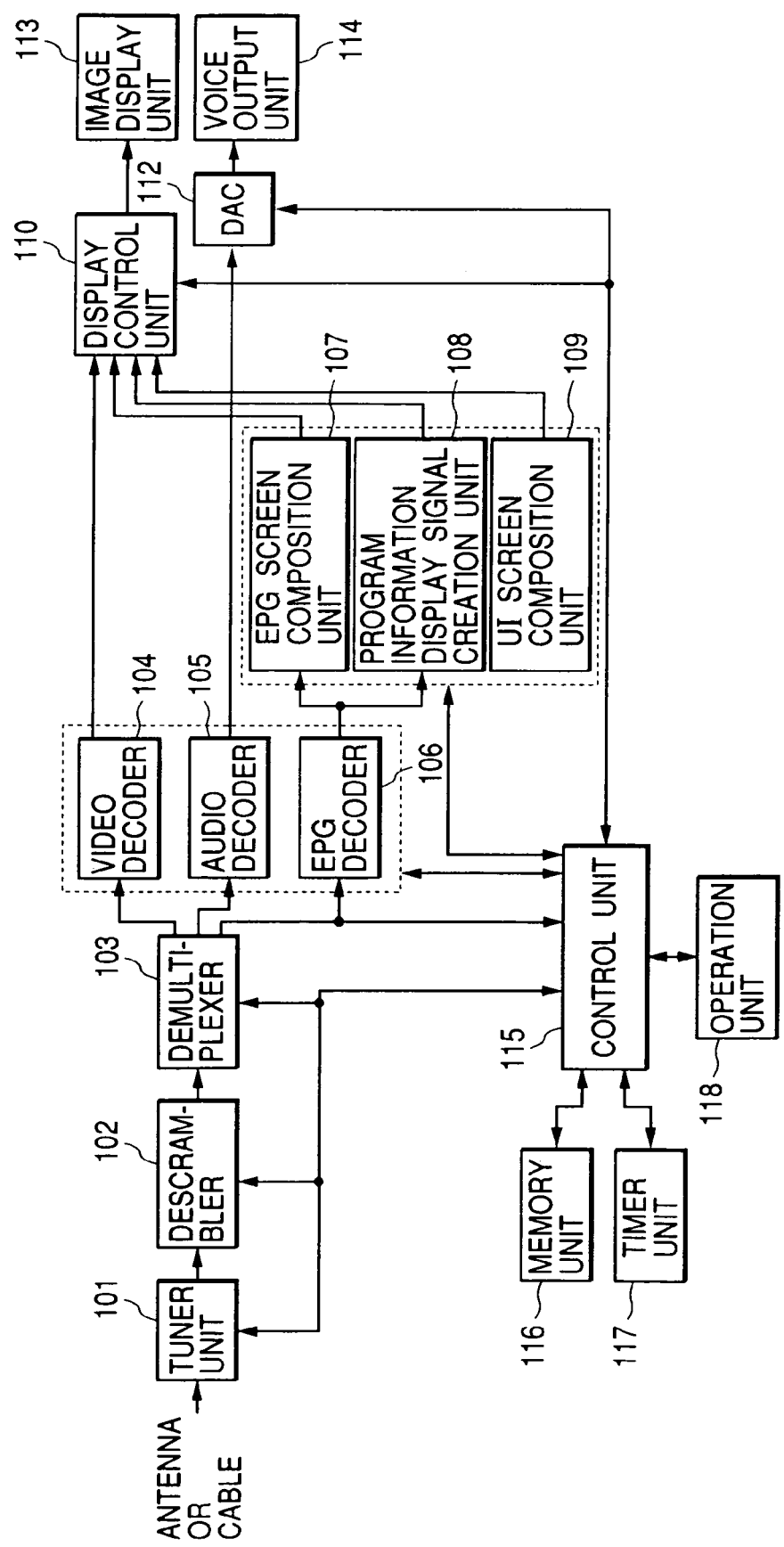
FIG. 1 is a block diagram showing the structure of a digital TV broadcasting receiver to which the invention is applied.

FIG. 1 is a diagram showing the structure of a digital TV broadcasting receiver to which the invention is applied.

Referring to FIG. 1, a signal received at an unrepresented antenna or cable is input to a tuner unit 101. The tuner unit 101 processes the input signal to perform demodulation, error correction and the like and generates digital data of a format called a transport stream. The generated transport stream (TS) data is output to a descrambler 102.

When the TS data scrambled for viewing and listening limitation is input from the tuner unit 101, the descrambler 102 descrambles the TS data by using first descramble key information contained in the TS data and second key information output from an unrepresented IC card control unit in a control unit 115, and outputs the descrambled TS data to a demultiplexer 103.

The IC card control unit includes an IC card which stores therein user contract information and the second key information for deciphering the descramble first key information contained in the TS data. The IC card control unit outputs the second key information to the descrambler 102 when the second key information deciphering the descramble first key information exists in the descrambler 102.

If TS data not scrambled is input from the tuner unit 101, the descrambler 102 outputs the TS data not scrambled itself to the demultiplexer 103.

From the TS data input from the descrambler 102 and having time-division multiplexed image data, voice data, EPG data and the like of a plurality of channels, the demultiplexer 103 picks up the image data and voice data of a program on air at a channel selected by an operation units 118. The image data and voice data are output to a video decoder 104 and an audio decoder 105, respectively. The operation unit 118 is mounted on the receiver side and also includes a remote controller and a light reception unit.

The demultiplexer 103 also picks up EPG data from the TS data and outputs it to an EPG decoder 106 and the control unit 115. The control unit 115 outputs the input EPG data to a memory unit 116. The memory unit 116 stores the EPG data supplied from the control unit 115.

The EPG data is periodically received at the tuner unit 101. The EPG data in the memory unit 116 is updated always to the latest EPG data. In addition, in response to an EPG data reception instruction by a user from the operation unit 118, EPG data is received and stored in the memory unit 116.

The TS data is transmitted in the unit of packet. PID (Packet Identification) is added to the top field of each packet. The demultiplexer 103 reads PID to distinguish among image data, voice data and EPG data.

Image data will be described. The video decoder 104 performs an MPEG2 decode process for the video data input from the multiplexer 103, and outputs the decoded video data to a display control unit 110. In response to a user input to the operation unit 118, the display control unit 110 switches between image data or superposes one image data upon another image data to display the result on an image display unit 113. The image data is input to the display control unit 110 from the video decoder 104, an EPG screen composition unit 107, a program information display signal creation unit 108 or a UI screen composition unit 109.

In response to a user input to the operation unit 118, the UI screen composition unit 109 generates a user operation support screen or the like and outputs it to the display control unit 110. The EPG screen composition unit 107 and program information display signal creation unit 108 will be later described.

The image display unit 113 includes an unrepresented monitor and an unrepresented video signal input terminal.

Next, voice data will be described. The audio decoder 105 performs a MPEG2 decode process for the voice data input from the demultiplexer 103 and outputs the decoded voice data to a DAC 112. DAC 112 performs a D/A conversion process for the voice data input from the audio decoder 105 and outputs it to a voice output unit 105. The voice output unit 114 includes an unrepresented speaker and an unrepresented audio signal input terminal.

Next, EPG data will be described. Data necessary for configuring EPG is transmitted in the data structure stipulated in "IEC13818-1 MPEG2 SYSTEM", in Standard Specifications "Program List Information Used for Digital Broadcasting" by Association of Radio Industries and Businesses (generally called ARIB), a corporate juridical person, or in other documents. Main constitutional data includes: the name of an organizing channel; the name of a broadcaster; a service description table (SDT) for transmitting information on an organizing table; a bouquet association table (BAT) for transmitting information on a bouquet such as the name of a bouquet (a set of organizing channels) and included organizing channels; an event information table (EIT) for transmitting information on a program such as the name of a program, broadcast start day and time, and description of contents; a time data table (TDT) for transmitting information on present day and time; and the like.

When the operation unit 118 is operated to display an EPG screen, an EPG screen display instruction is input from the operation unit 118 to the control unit 115. Different from the program information display to be described later, the EPG screen display is a screen display like a television program table having a vertical time axis and a horizontal channel program axis.

When the EPG screen display instruction is input from the operation unit 118, the control unit 115 reads necessary information from the memory unit 116 and outputs it to the EPG decoder 106. The EPG decoder 106 performs a decode process for the EPG data and outputs the decoded EPG data to the EPG screen composition unit 107.

In accordance with the EPG data input from the EPG decoder 106 and a control signal input from the control unit 115, the EPG screen composition unit 107 generates various signals such as a character signal for composing an unrepresented EPG screen, and outputs them to the display control unit 110. The display control unit 110 outputs image signals to the image display unit 113 to switch among an image screen, an EPG screen and the like.

Figure 2:
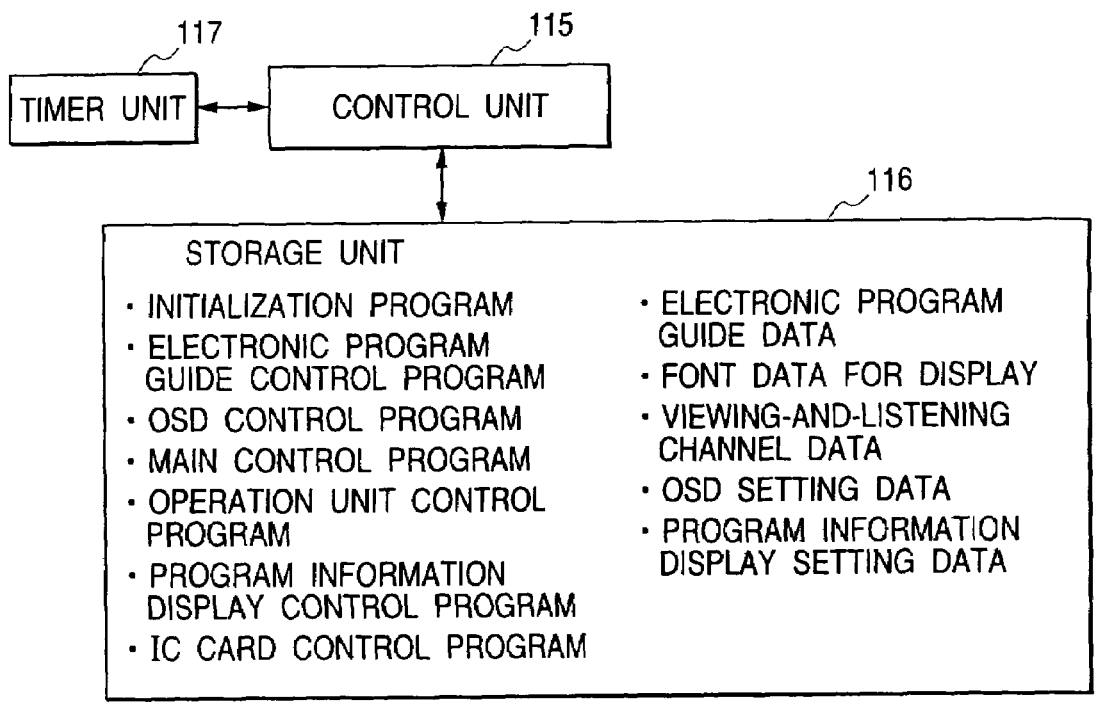
FIG. 2 is diagram showing an example of a control program and data stored in a memory unit 116.

The control unit 115 includes a microprocessor. In response to an activation of the operation unit 118 having various operation switches such as a switch for selecting a channel and a switch for turning the power supply on, the control unit 115 reads each control program stored in the memory unit 116 and executes the read program. FIG. 2 shows control programs and data stored in the memory unit 116.

With the receiver constructed as above, the control unit 115 controls the tuner unit 101, descrambler 102, demultiplexer 103, decoder units 104 to 106, EPG screen composition unit 107, program information display signal creation unit 108, UI screen composition unit 109, display control unit 110, DAC 112 and the like.

Figure 3:
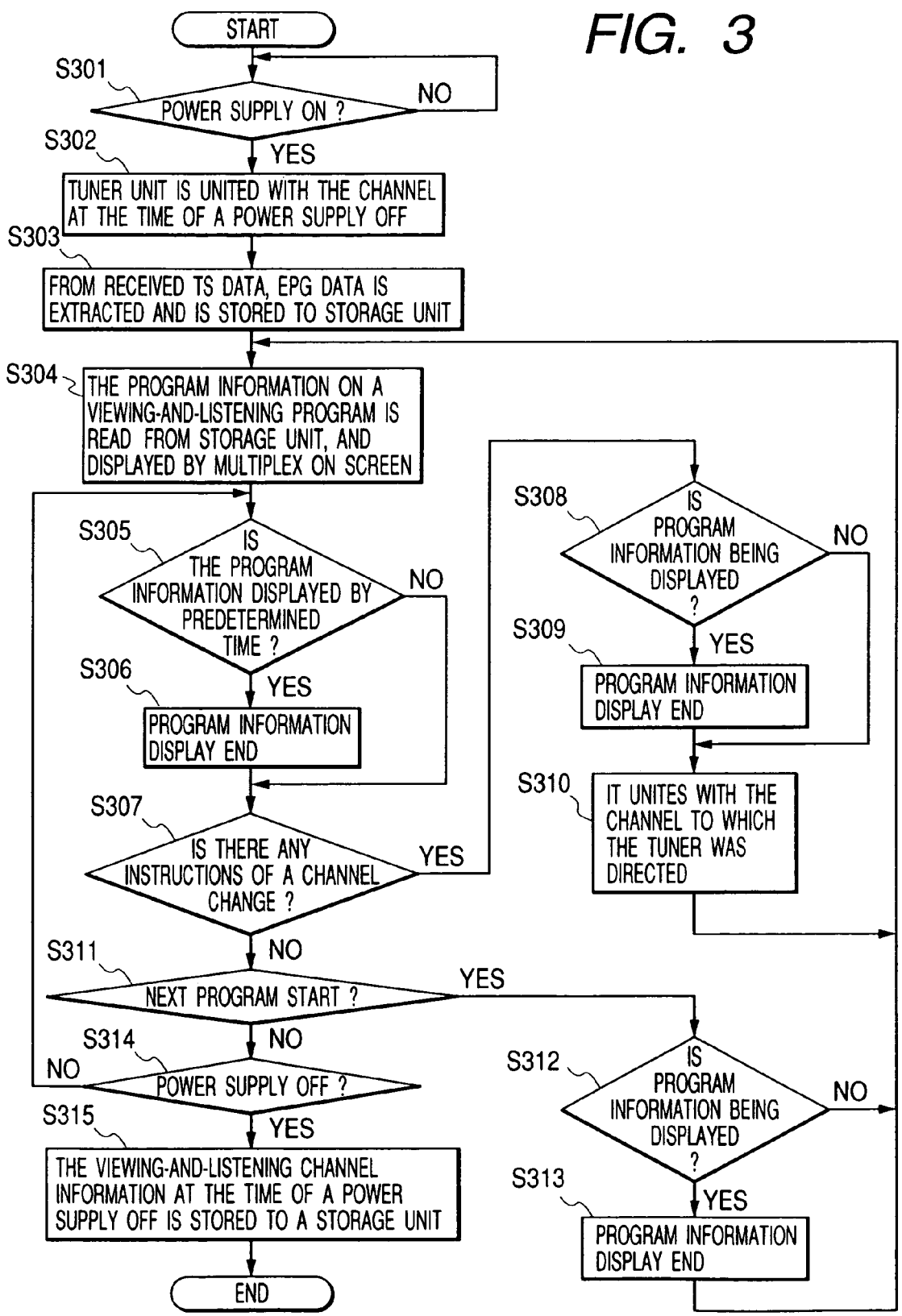
FIG. 3 is a flow chart illustrating an operation to be executed by a control unit 115 when program information is superposed upon a program image screen.

Next, an operation to be executed by the control unit 115 to superpose program information upon a program image screen will be described with reference to the flow chart shown in FIG. 3.

At Step S301, it is checked whether the power supply of the receiver is turned on. If not, the flow stands by until the power supply is turned on. If it is judged that the power supply is turned on, viewed and listened channel information at the time when the power supply was lastly turned off is read from the memory unit 116, and the tuner unit 101 is controlled to receive the viewed and listened channel information at the time when the power supply was lastly turned off (Step S302).

At Step S303, EPG data is extracted from the TS data input to the tuner unit 101 and stored in the memory unit 116.

At Step S304, information on a program presently viewed and listened is read from the memory unit 116 and output to the program information display signal creation unit 108. The program information is read from the memory unit 116 in accordance with the contents set on the program information display setting screen to be described later.

In accordance with the input program information and the contents set on the program information display setting screen to be described later, the program information display signal creation unit 108 generates character signals and output them to the display control unit 110, the character signals being used for displaying a character image including characters, marks, symbols and the like for displaying program information. In accordance with the input character signals, the display control unit 110 superposes program information upon a program image screen such as shown in FIGS. 4 to 7.

At Step S305, it is checked whether the program information is displayed for a predetermined time. If not, the flow advances to Step S307, whereas if displayed, the program information display is terminated (Step S306) to advance to Step S307. The predetermined time changes with a selection item in "time to display cancellation" on the program information display setting screen to be described later.

At Step S307, it is checked whether a channel change instruction is input. If not, the flow advances to Step S311, whereas if input, it is checked whether program information is being displayed (Step S308). If the program information is not displayed, the flow advances to Step S310, whereas if displayed, at Step S309 the program information display is terminated to thereafter advance to Step S310. At Step S310, the tuner unit 101 is controlled to receive the instructed channel to thereafter return to Step S304.

At Step S311, it is checked whether the program next to the presently viewed and listened program starts being broadcast. If not, the flow advances to Step S314. Whether the next program starts being broadcast is checked by the control unit 118 in the following manner. The control unit 118 derives the broadcast start time of the next program from the EPG data stored in the memory unit 116 and compares it with the present time read from a timer unit 117.

If it is judged that the next program starts being broadcast, then at Step S312 it is checked whether the program information is being displayed. If not, the flow returns to Step S304, whereas if being displayed, the program information display is terminated (at Step S313) to thereafter return to Step S304.

At Step S314, it is checked whether a power supply turn-off instruction is input. If not, the flow returns to Step S305, whereas if input, the viewed and listened channel information at the time of the power supply turn-off is stored in the memory unit 116 (Step S315) to terminate the control by the control unit.

The program information is displayed on the screen after the power supply is turned on, after the channel is changed, and while commercial images are being broadcast in the program received when the next program starts being broadcast. In the last case, the program information of the program inserted with commercial images is superposed on the commercial images.

Next, the display styles and contents of program information will be described. FIGS. 4 to 7 show examples of the program information.

Figure 4:
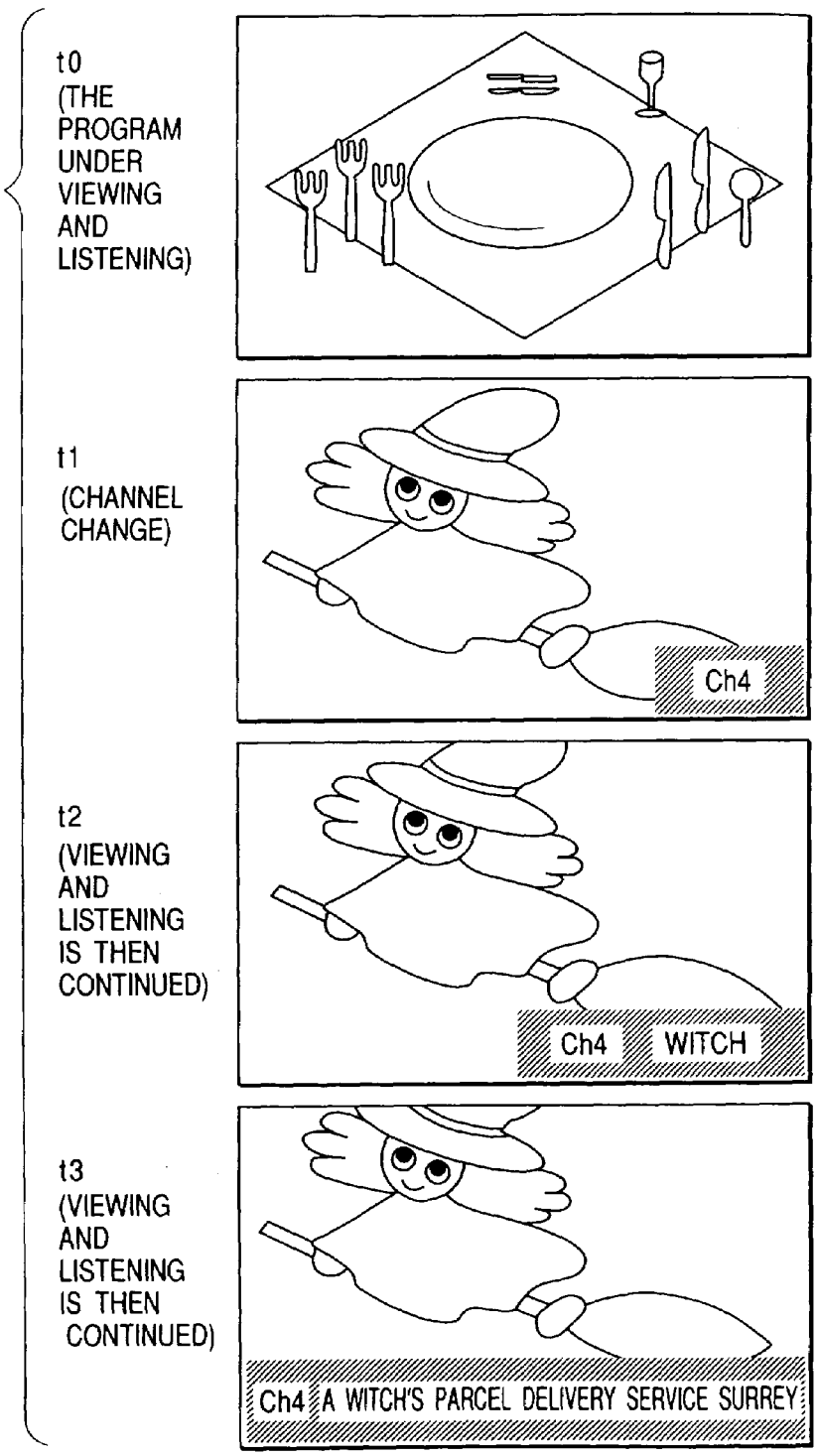
FIG. 4 is diagrams showing an example of superposing program information on the program image screen.
Figure 5:
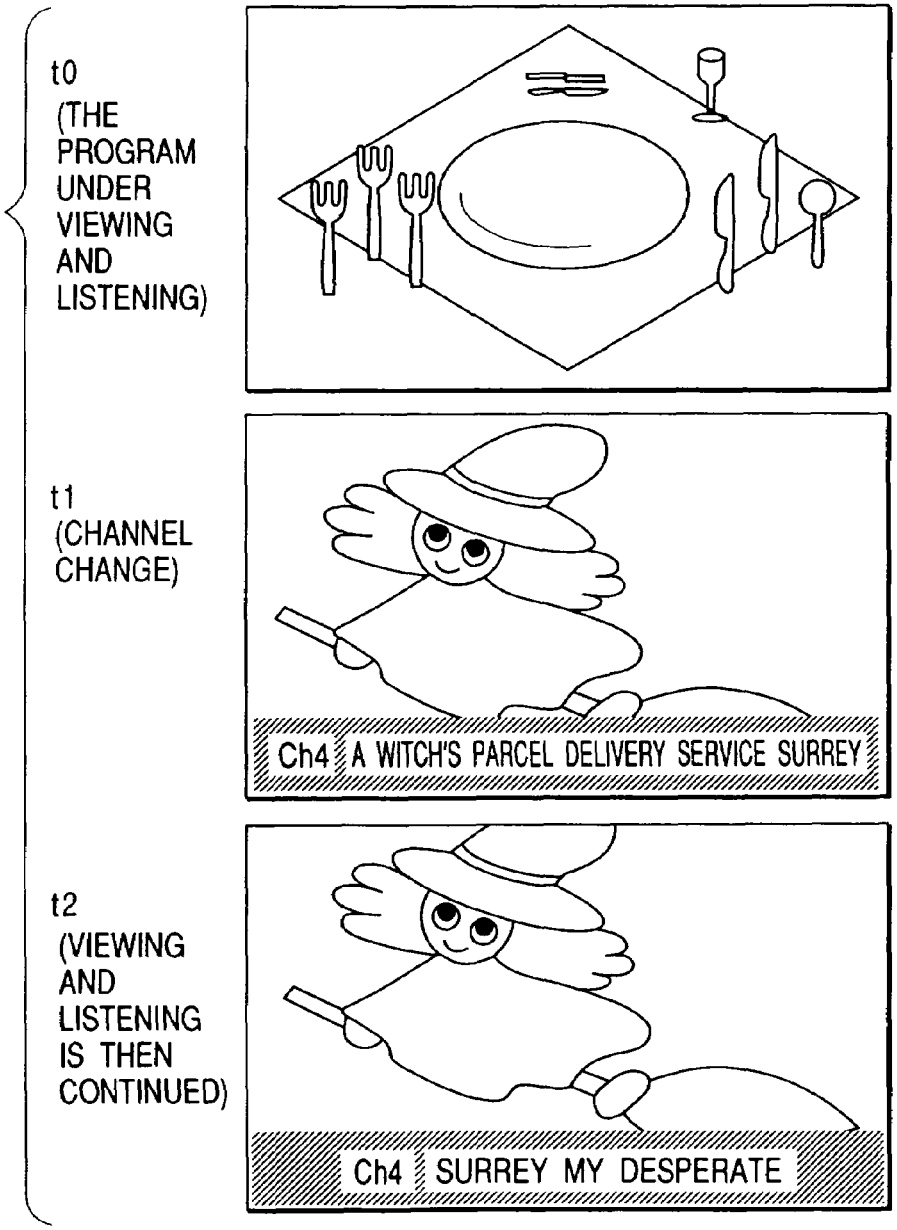
FIG. 5 is diagrams showing another example of superposing program information on the program image screen.

FIGS. 4 and 5 show display examples of the program information when a channel change instruction is issued. At time t1, in response to a channel change request for changing the channel from the program viewed and listened at time t0 to a channel CH4, the program information such as the CH (channel) number and a program name is displayed in the bottom area of the screen at times t1, t2 and t3. The CH number is displayed when the program information is displayed in response to a channel change request or a power supply turn-on.

In the example shown in FIG. 4, a CH number and a program name are displayed being scrolled in the horizontal direction. The scroll speed changes with the selection item set in "display speed" on the program information display setting screen to be described later. In the example shown in FIG. 5, the program information is fixedly displayed, and after the program name is displayed for a predetermined time, the program contents are displayed. The program information to be displayed on the screen changes from fundamental information such as a CH number and program name to detailed information such as program contents and star names. The predetermined time changes with the selection item set in "change time" on the program information display setting screen to be described later.

Figure 6:
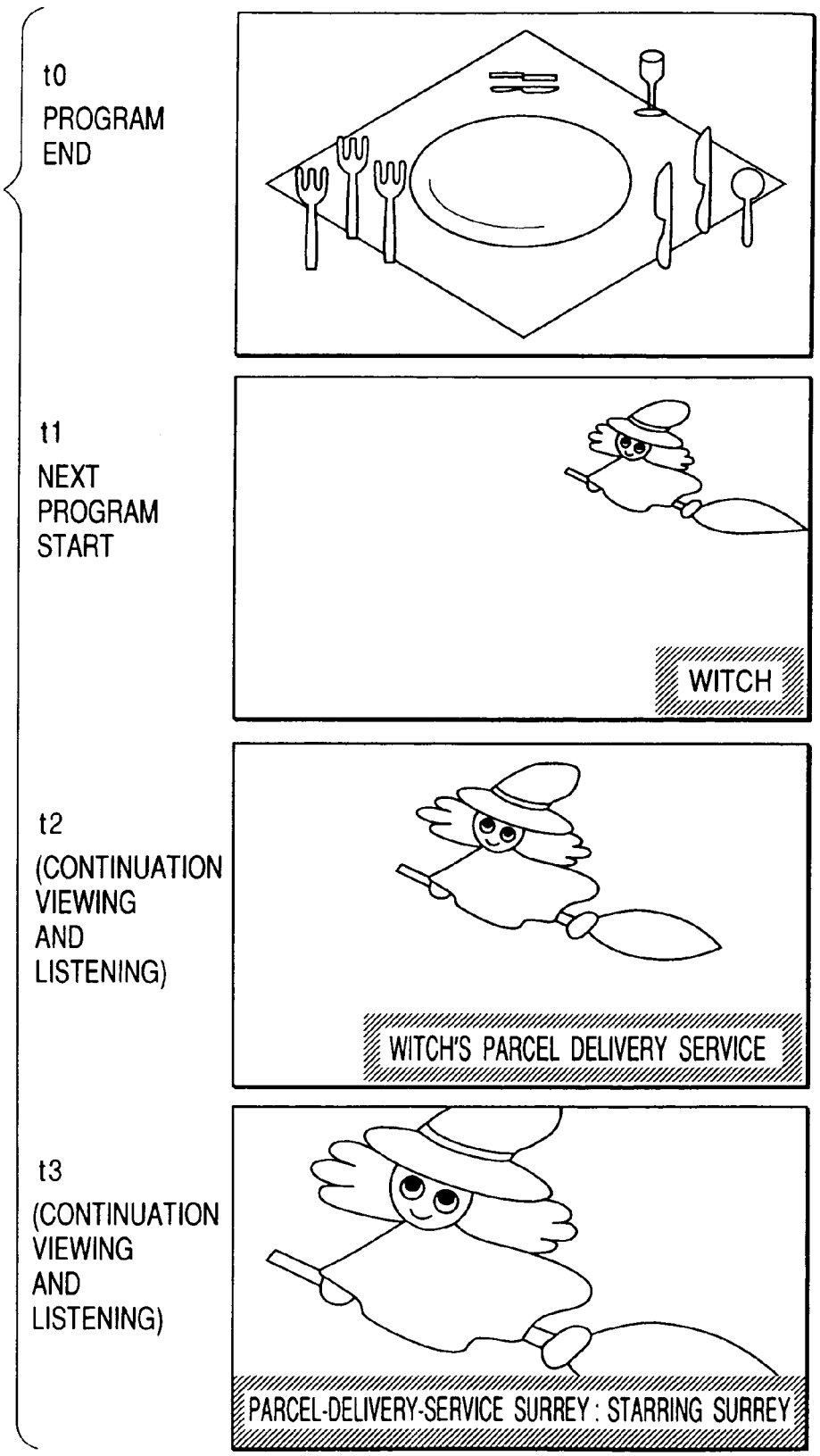
FIG. 6 is diagrams showing another example of superposing program information on the program image screen.
Figure 7:
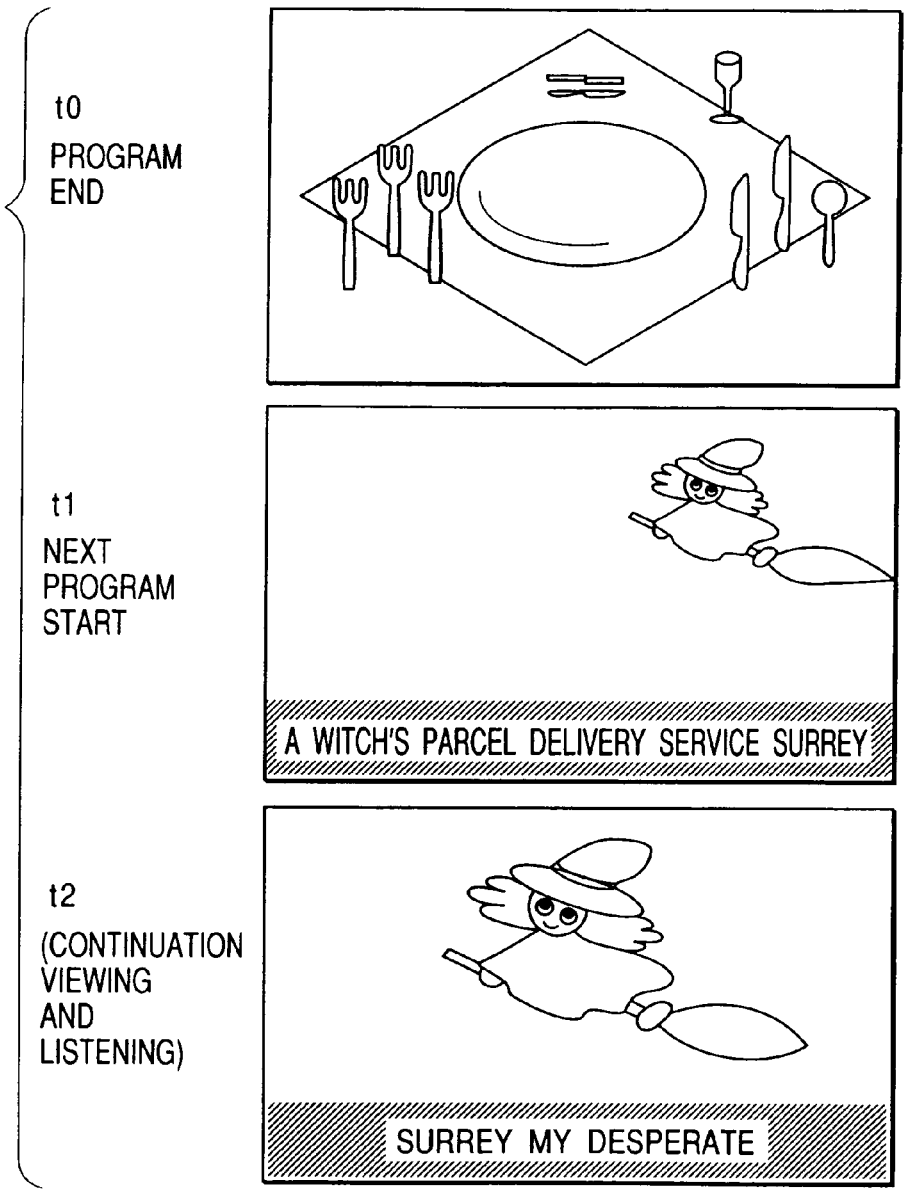
FIG. 7 is diagrams showing another example of superposing program information on the program image screen.

In the examples shown in FIGS. 6 and 7, after a program is finished, the next program starts and the program information is displayed. At time t0, a program is finished, and as the next program starts, the program information such as a program name is displayed in the bottom area of the screen at times t1, t2 and t3. In the example shown in FIG. 6, the program name is displayed while being scrolled. In the example shown in FIG. 7, the program information is fixedly displayed, and after the program name is displayed for a predetermined time, the program contents are displayed.

Various setting for the program information such as the display contents of the program information and a display method can be set on the program information display setting screen, the details of which will be given later.

Figure 8:
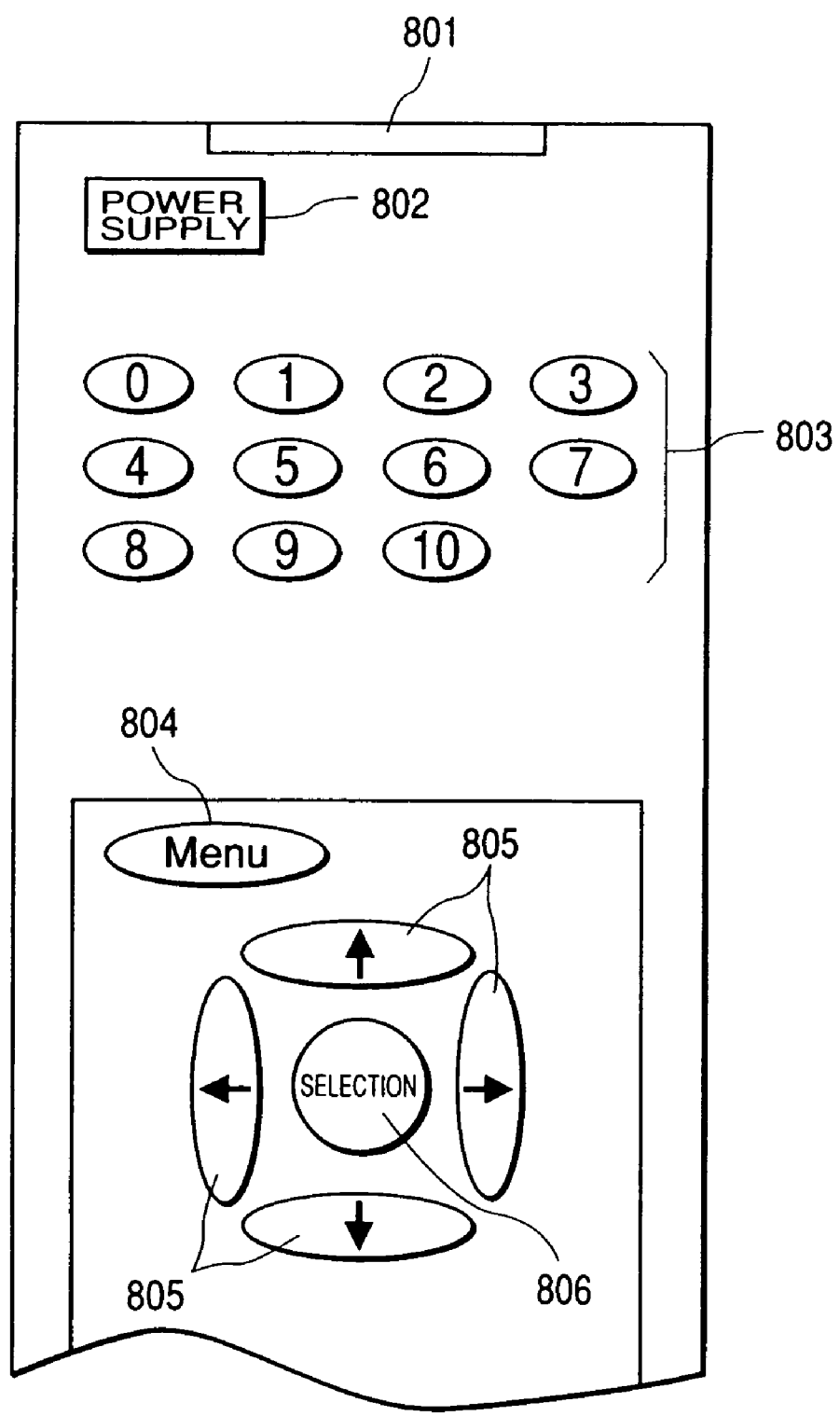
FIG. 8 is a diagram showing an example of the structure of a remote controller.

FIG. 8 shows an example of the structure of a remote controller constituting part of the operation unit 118. In FIG. 8, only buttons necessary for realizing the functions of the embodiment are shown and other operation buttons essential for the receiver are not shown.

A pointing device such as a mouse may also be used in addition to the remote controller shown in FIG. 8.

Referring to FIG. 8, reference numeral 801 represents a light emission unit for infrared communications between the remote controller and a light reception unit of the digital broadcasting receiver. Reference numeral 802 represents a power supply button for turning on and off the power supply. Reference numeral 803 represents ten-keys for entering a channel number. Reference numeral 804 represents a menu button for displaying an unrepresented menu screen such as the program information display setting screen and EPG screen. Reference numeral 805 represents cursor buttons for moving a selection cursor right and left and up and down. Reference numeral 806 represents a selection button for determining a selection of an area designated by the selection cursor.

Next, various setting for the program information such as the contents of the program information and a display method will be described. FIG. 9 shows an example of the program information setting screen. This screen can be displayed by selecting a menu item on an unrepresented menu screen displayed in response to a depression of the menu button 804 shown in FIG. 8.

Referring to FIG. 9, reference numeral 900 represents a selection cursor which is moved up and down and right and left by operating the cursor button 805 shown in FIG. 8. As the selection cursor 900 is moved to a desired item and the selection button 806 is depressed, the background of the selected item takes the same color as that of the screen background. In the areas 902 to 908, only one item can be selected from a plurality of item candidates. The background of the item selected by depressing the selection button 806 takes the same color as that of the screen background, and the items other than the selected item are displayed hatched.

After a desired item is selected, the selection cursor 900 is placed on a decision button 910 shown in FIG. 9 and the selection button 806 shown in FIG. 8 is depressed to thereby determine the item on the program information setting screen shown in FIG. 9. If setting on the program information setting screen is not made and the screen is to be changed, the selection cursor 900 is placed on a cancellation button 911 shown in FIG. 9 and the selection button 806 shown in FIG. 8 is depressed to return to the unrepresented menu screen.

Each of the setting contents on the program information setting screen will be described. Reference numeral 901 represents an area for setting a display timing. A user can select at least one of three timings including the timing when the power supply is turned on, the timing when a channel is changed, and the timing when a next program starts. Reference numeral 902 represents an area for setting a display area. A user can select one of the screen lower end, upper end, left end and right end. Reference numeral 903 represents an area for setting the size of a display character. A user can select one of small, common, and large.

Reference numeral 904 represents an area for setting a predetermined time when the program information display is finished, i.e., a time to display cancellation. A user can select one of very late, late, common, early, very early. Reference numeral 905 represents an area for setting a display method. A user can select one of a scroll display and a fixed display.

Reference numeral 906 represents an area for setting a speed of the scroll display. A user can select one of very late, late, common, early, very early. When the fixed display in the area 905 is selected, the area 906 is displayed hatched to disable the item selection.

Reference numeral 907 represents an area for setting a change time when the contents in the fixed display are changed. A user can select one of very late, late, common, early, very early. When the scroll display in the area 905 is selected, the area 907 is displayed hatched to disable the item selection.

Reference numeral 908 represents an area for setting the repetition of a display. If the display is repeated, the number of repetitions can be selected. Reference numeral 909 represents an area for setting the display contents. A user can select at least one of a program name, program contents, and contents of program details.

As described above, according to the embodiment, when a channel is changed and images displayed on the screen are changed, the program information of the displayed program can be displayed at once so that a user can easily recognize the program contents and the like.

In the embodiment, when the power supply is turned on or the next program starts, the program information of the displayed program can be displayed at once so that a user can easily recognize the program contents and the like.

In the embodiment, even if commercial images are broadcast in the program received when the power supply is turned on, when the next program starts, or when the channel is changed, the program information of the displayed program inserted with commercial images can be displayed at once without waiting until the program is broadcast so that a user can easily recognize the program contents and the like.

In the embodiment, although the program information display is finished after the lapse of a predetermined time from when the program information is displayed, the program information display may be finished after a series of program information is displayed.

In the embodiment, although the program information is displayed when the next program starts being broadcast, the program information of the next program may be displayed when the preceding program is finished.

In the embodiment, although the character size of the program information is set by a user, the character size may be set automatically in accordance with the number of characters of the program information to be displayed.

In the embodiment, it is assumed that each TS is multiplexed with EPG data and the TS data received at the tuner unit is separated at the demultiplexer into EPG data, program image data and sound data. If EPG data is multiplexed in a specific TS, a tuner unit for EPG data reception and a tuner unit for program image and sound data reception may be provided.

As described so far, according to the invention, when a channel is changed and images displayed on the screen are changed, the program information of the displayed program can be displayed at once so that a user can easily recognize the program contents and the like.

When the power supply is turned on or the next program starts, the program information of the displayed program can be displayed at once so that a user can easily recognize the program contents and the like.

Even if commercial images are broadcast in the program received when the power supply is turned on, when the next program starts, or when the channel is changed, the program information of the displayed program inserted with commercial images can be displayed at once without waiting until the program is broadcast so that a user can easily recognize the program contents and the like.

What is claimed is:

1. An information processing method comprising the steps of:

inputting video data and program information data into an apparatus;

displaying video images of a first program derived from the inputted video data on a display device;

displaying on the display device, in response to a change from the first program to a second program, program information for the second program derived from the inputted program information data, together with video images of the second program derived from the inputted video data; and displaying a setting screen for setting the duration of program information display for the second program, wherein the duration of the program information display for the second program meets a condition set at the setting screen.

2. An information processing method according to claim 1, wherein said inputting step includes:

a reception step, of receiving transport stream data transmitted by digital television broadcasting; and a deriving step, of deriving the video data from the transport stream data received in said reception step.

3. An information processing method according to claim 1, wherein said inputting step includes:

a reception step, of receiving transport stream data transmitted by digital television broadcasting; and a deriving step, of deriving the program information data from the transport stream data received in said reception step.

4. An information processing method according to claim 3, further comprising the step of storing in a memory the program information data derived in said deriving step, wherein the program information for the second program is derived from the program information data stored in the memory.

5. An information processing method according to claim 1, further comprising a manual setting step, of setting contents of the program information to be displayed in said program information displaying step.

6. An information processing method according to claim 5, wherein said manual setting step includes setting at least one of a display timing, a display area, a display character size, a display method, a number of display repetitions, and display contents.

7. An information processing method according to claim 1, wherein said program information display step includes displaying, in response to turning on of the apparatus, the program information for the first program derived from the program information data, together with video images of the first program derived from the input video data.

8. An information processing method according to claim 1, wherein said program information display step includes displaying program information for the second program on the display device in response to a broadcast end of the first program, followed by a broadcast of the second program and display of the video images of the second program.

9. An information processing method according to claim 1, wherein said program information displaying step includes displaying video images of the second program derived from the input video data include commercial video images and, in response to a change from the first program to the second program, the program information for the second program is displayed on the display device together with the commercial video images.

10. The method according to claim 1, wherein the program information for the second program is displayed so as to veil a part of the video image of the second program.

* * * * *

UNITED STATES PATENT AND TRADEMARK OFFICE
CERTIFICATE OF CORRECTION

PATENT NO. : 7,271,848 B2  
APPLICATION NO. : 09/822189  
DATED : September 18, 2007  
INVENTOR(S) : Akio Saito Page 1 of 1

It is certified that error appears in the above-identified patent and that said Letters Patent is hereby corrected as shown below:

COLUMN 2

Line 20, "is" should read --is a--;
Line 25, "is" should read --are--;
Line 27, "is" should read --are--;
Line 29, "is" should read --are--; and
Line 31, "is" should read --are--.

COLUMN 3

Line 5, "units" should read --unit--.

Signed and Sealed this

Ninth Day of September, 2008

JON W. DUDAS
*Director of the United States Patent and Trademark Office*